United States Patent
Li et al.

(10) Patent No.: US 8,917,625 B2
(45) Date of Patent: Dec. 23, 2014

(54) MAPPING QUALITY OF SERVICE (QOS) FROM A WIRELESS NETWORK TO A WIRED NETWORK

(75) Inventors: Gordon Yong Li, San Diego, CA (US); Victor T. Hou, La Jolla, CA (US); Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 259 days.

(21) Appl. No.: 12/943,209

(22) Filed: Nov. 10, 2010

(65) Prior Publication Data

US 2011/0110266 A1     May 12, 2011

Related U.S. Application Data

(60) Provisional application No. 61/259,911, filed on Nov. 10, 2009.

(51) Int. Cl.
| | |
|---|---|
| *H04L 12/26* | (2006.01) |
| *H04W 28/24* | (2009.01) |
| *H04W 56/00* | (2009.01) |
| *H04L 12/857* | (2013.01) |
| *H04L 12/24* | (2006.01) |
| *H04L 12/851* | (2013.01) |
| *H04L 12/801* | (2013.01) |

(52) U.S. Cl.
CPC .............. *H04W 56/00* (2013.01); *H04W 28/24* (2013.01); *H04L 41/0213* (2013.01); *H04L 47/2408* (2013.01); *H04L 47/2491* (2013.01); *H04L 47/2425* (2013.01); *H04L 41/0816* (2013.01); *H04L 47/14* (2013.01)
USPC ........... 370/253; 370/252; 370/328; 370/329; 455/435.1; 455/436

(58) Field of Classification Search
CPC ..... H04L 12/26; H04L 47/2491; H04L 47/14; H04L 41/0213; H04L 41/0816; H04W 28/24; H04W 84/045; H04W 92/02; H04W 12/06; H04W 36/14
USPC ......... 370/253, 338, 252, 465, 401, 412, 428, 370/466, 331, 329, 328; 455/436, 435.1
See application file for complete search history.

(56) References Cited

U.S. PATENT DOCUMENTS 7,688,849 B2 *  3/2010  Rabie et al. ................... 370/466
2003/0093526 A1  5/2003  Nandagopalan et al.
(Continued)

OTHER PUBLICATIONS

Office Action, dated Aug. 22, 2012, for U.S. Appl. No. 12/943,402, filed Nov. 10, 2010, 26 pages.

(Continued)

*Primary Examiner* — Jamal Javaid
(74) *Attorney, Agent, or Firm* — Sterne, Kessler, Goldstein & Fox PLLC

(57) ABSTRACT

A system and method to map a Quality of Service (QoS) of a traffic flow from a wireless network to a wired network is described herein. The method comprises the steps of receiving a packet of the traffic flow over the wireless network and determining a first Quality of Service associated with the traffic flow over the wireless network based on a first set of parameters associated with the packet. The method further comprises the step of determining a second parameter that identifies a second Quality of Service over the wired network, wherein the second Quality of Service is substantially equivalent to the first Quality of Service. The method also comprises inserting the second parameter in a field of the packet based on the determined second Quality of Service and transmitting the packet over the wired network.

35 Claims, 7 Drawing Sheets

(56) References Cited

U.S. PATENT DOCUMENTS

| | | | |
|---|---|---|---|
| 2006/0165103 A1* | 7/2006 | Trudeau et al. | 370/401 |
| 2007/0025297 A1 | 2/2007 | Lee et al. | |
| 2007/0140195 A1* | 6/2007 | Kaftan | 370/338 |
| 2007/0286138 A1 | 12/2007 | Kaftan | |
| 2008/0049695 A1* | 2/2008 | Ogura | 370/338 |
| 2008/0285592 A1* | 11/2008 | Emmendorfer et al. | 370/474 |
| 2009/0285176 A1 | 11/2009 | Zheng et al. | |
| 2010/0135264 A1 | 6/2010 | Nilsson | |
| 2010/0172239 A1 | 7/2010 | Corliano et al. | |
| 2011/0096749 A1 | 4/2011 | Rune | |
| 2011/0113146 A1 | 5/2011 | Li et al. | |

OTHER PUBLICATIONS

Office Action, dated Dec. 27, 2012 for U.S. Appl. No. 12/943,402, filed Nov. 10, 2010, 30 pages.

\* cited by examiner

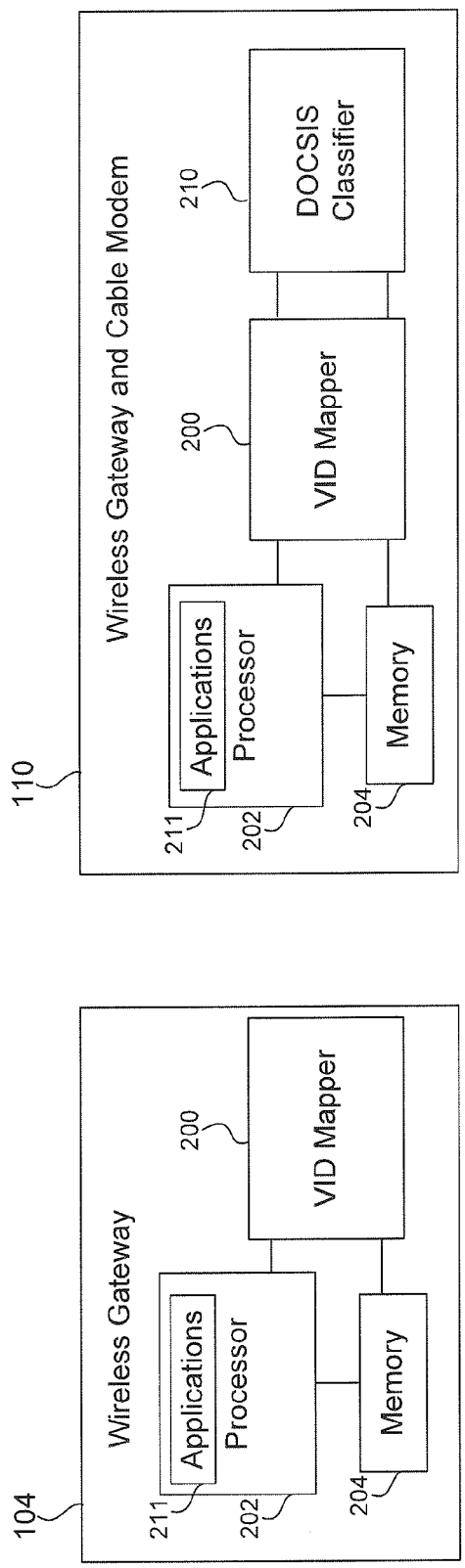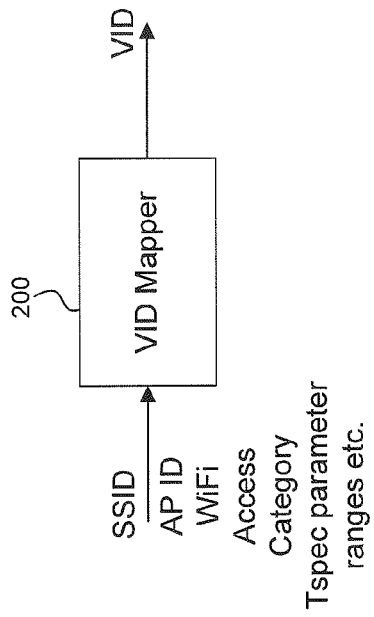
FIG. 2B
FIG. 2C
FIG. 2A

MAPPING QUALITY OF SERVICE (QOS) FROM A WIRELESS NETWORK TO A WIRED NETWORK

CROSS REFERENCE TO RELATED APPLICATIONS

This application claims the benefit of U.S. Provisional Application No. 61/259,911 filed Nov. 10, 2009, which is incorporated herein by reference in its entirety.

BACKGROUND OF THE INVENTION

1. Field of the Invention

This application generally relates to Quality of Service (QoS) over wireless and wired networks.

2. Background Art

Applications running on wireless devices such as iPhones™, wireless enabled laptops, personal digital assistants (PDAs) or any device that communicates over a wireless network have differing Quality of Service (QoS) requirements depending upon the nature of the application. For example, Voice over Internet Protocol (VoIP) applications such as Skype™ require specific parameters such as a controlled latency and jitter for desired operation. The destination for traffic flows generated by wireless devices may be across a wired network. For example, a VoIP call started on a wireless device may have to be routed over a wired network to, for example, a laptop. However, current systems are not able to map QoS over a wireless network to a corresponding QoS over a wired network. The lack of such a mapping may prevent an application running on a wireless device from functioning adequately because its QoS is not matched over the wired network.

Methods and systems are needed to overcome the above mentioned deficiency.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

FIG. 2A further illustrates a wireless gateway according to an embodiment of the invention.

FIG. 2B further illustrates a wireless gateway and cable modem according to an embodiment of the invention.

FIG. 2C further illustrates a Virtual Local Area Network Identification (VID) mapper.

Figure 2D:
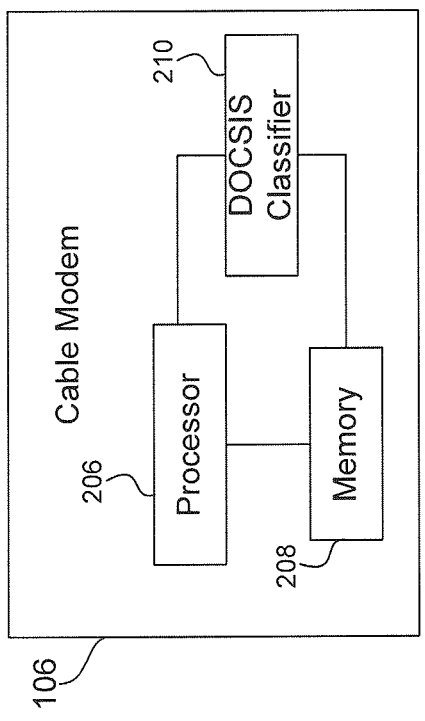

FIG. 2D further illustrates a cable modem according to an embodiment of the invention.

Figure 2E:
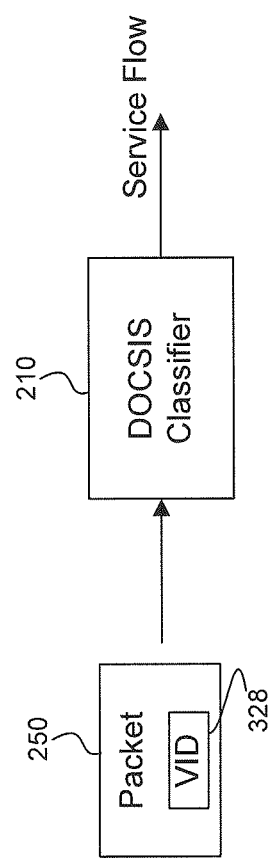

FIG. 2E further illustrates a Data Over Cable Service Interface Specification (DOCSIS) classifier according to an embodiment of the invention.

Figure 3A:
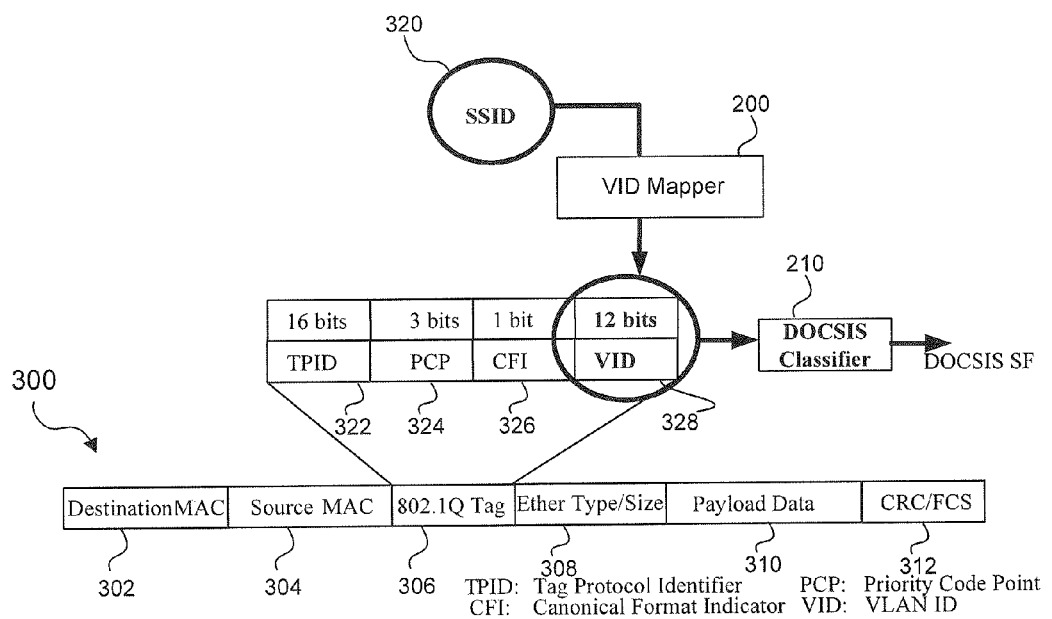

FIG. 3A illustrates an example Ethernet packet that may be transmitted from a wireless gateway to a cable modem according to an embodiment of the invention.

Figure 3B:
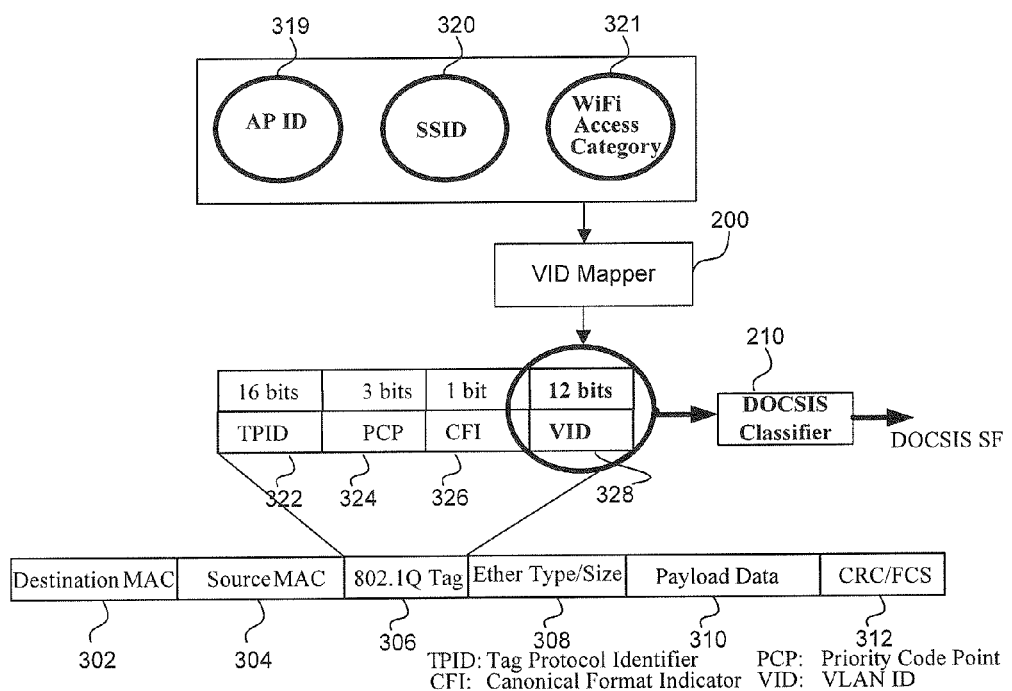

FIG. 3B shows an example Ethernet packet that may be transmitted from a wireless gateway to a cable modem according to a further embodiment of the invention.

Figure 4:
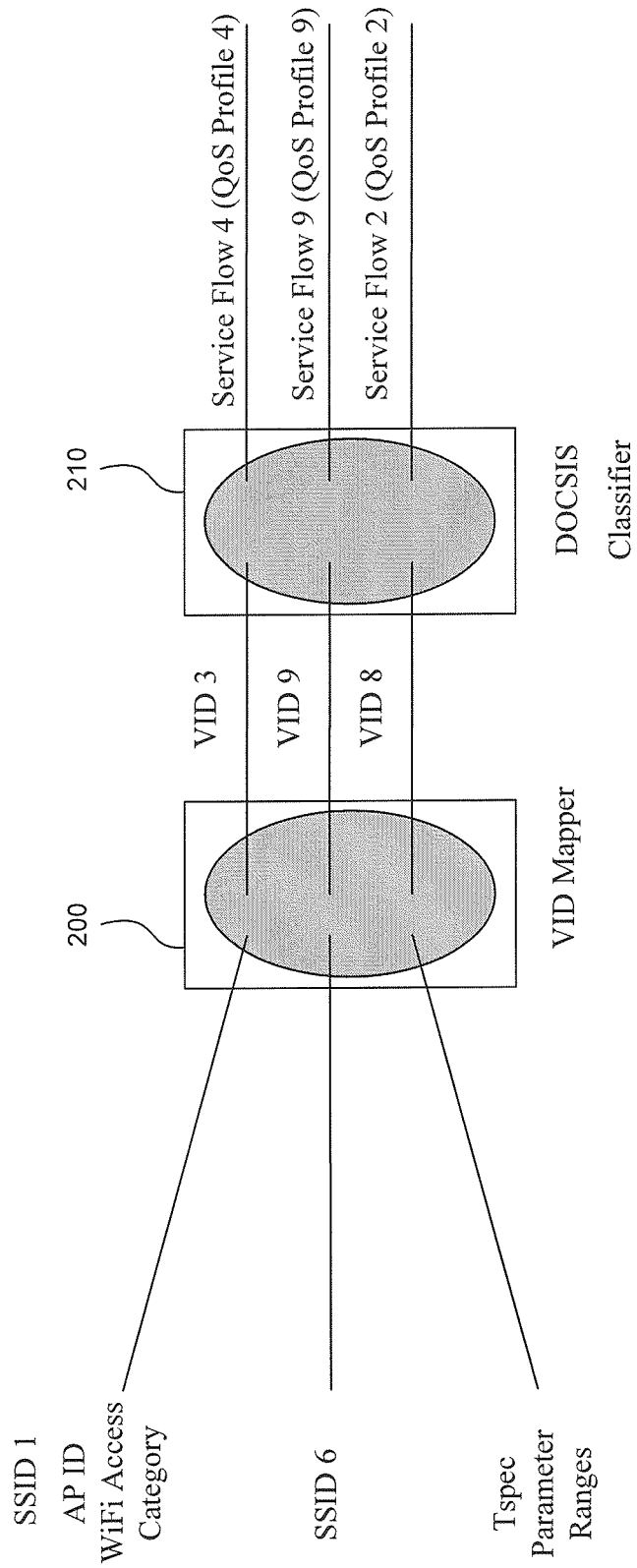

FIG. 4 illustrates an example mapping of traffic flows from a wireless network to a wired network according to an embodiment of the invention.

Figure 5:
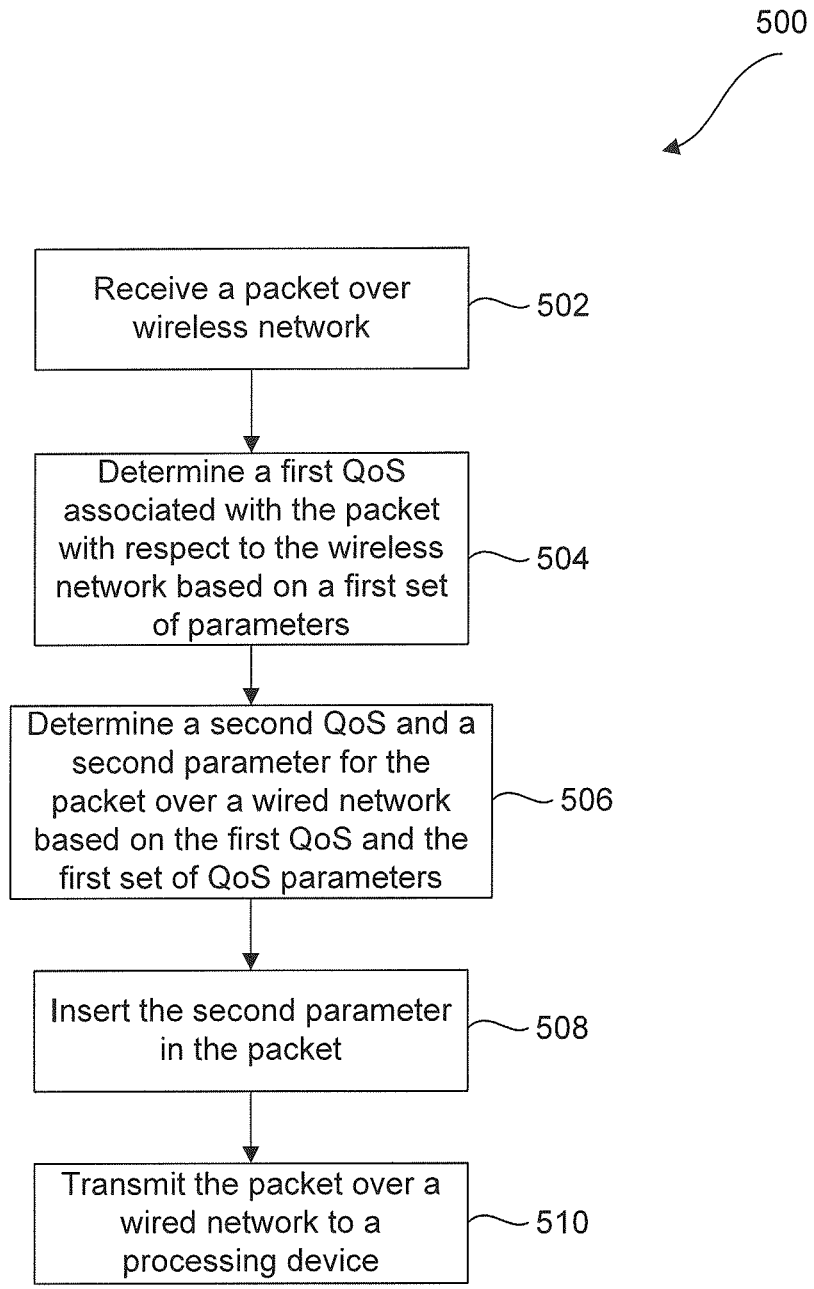

FIG. 5 illustrates an example flow chart illustrating steps performed to map Quality of Service (QoS) parameters associated with a traffic flow from a wireless network to a wired network according to an embodiment of the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Figure 1A:
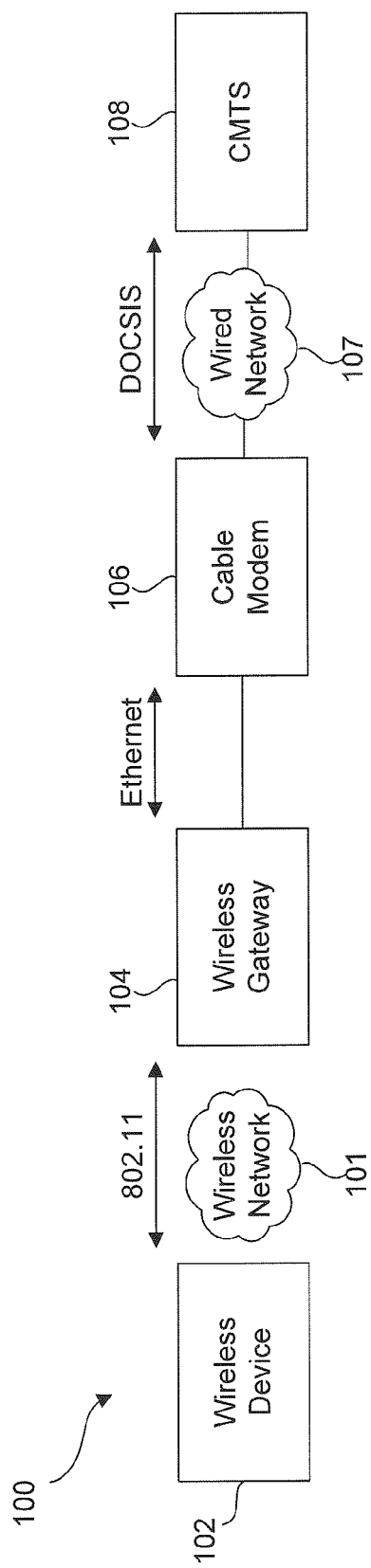
FIG. 1A illustrates an example communication system according to an embodiment of the invention.

FIG. 1A illustrates an example communication system 100 according to an embodiment of the invention. System 100 includes wireless device 102, wireless gateway 104, cable modem 106, and cable modem termination system (CMTS) 108. Wireless device 102 communicates with wireless gateway 104 over wireless network 101. Cable modem 106 communicates with CMTS 108 over wired network 107.

A "wireless device" as described herein refers to a device that can communicate wirelessly with other devices i.e. without using tangible physical media such as coaxial cables, twisted pair Ethernet cables, optical fibers etc. For example, wireless device 102 is any device that can communicate wirelessly over wirelessly over wireless network 101. In an example, wireless device 102 may be referred to as a WiFi station (WiFi STA or simply STA). Wireless device 102 may be, for example, any wireless device including but not limited to a cellular phone such as an iPhone™, a wireless laptop or any device enabled to communicate over wireless network 101.

A "wireless network" as referred to herein may refer to any network that transmits and receives data between two or more devices without using physical media such as wires or cables. In an example, wireless network 101 is based on Institute of Electrical and Electronics Engineers (IEEE) 802.11 protocol for wireless communication networks. In another example, wireless network 101 may be referred to as a Wireless Local Area Network (WLAN) or a WiFi network.

Cable modem 106 communicates with cable modem termination 108 using a Data Over Cable Service Interface Specification (DOCSIS) protocol. Cable modem 106 and CMTS 108 are both referred to as "wired devices" herein. A "wired device" as described herein refers to a device that communicates using tangible physical media including but not limited to coaxial cables, twisted pair Ethernet cables, optical fibers etc. Cable modem 106 may communicate with wireless gateway 104 using Ethernet packets over an Ethernet network.

Wireless gateway 104 is both a wired device and a wireless device. Wireless gateway 104 can transmit and receive data both wirelessly and through wires. For example, wireless gateway 104 can communicate with wireless device 102 and can also communicate with cable modem 106. Wireless gateway 104 can communicate with wireless device 102 using 802.11 frames over wireless network 101. Wireless gateway 104 can also communicate with CMTS 108 via cable modem 106 over Ethernet cables in an Ethernet network and over wired network 107. Thus, the wireless gateway 104 serves as a conduit that bridges wireless network 101 and wired network 107. Wireless gateway 104, may also be referred to as a wireless access point (AP), a radio or a "wireless hotspot." In the example in FIG. 1A, wireless gateway 104 and cable modem 106 are physically separate devices with wireless gateway 104 being coupled to cable modem 106 via an Ethernet cable. Wireless gateway 104 sends data encapsulated in the 802.11 frames in an Ethernet format to cable modem 106. Cable modem 106 may encapsulate or convert the Ethernet packets into a DOCSIS format and transmit them to CMTS 108 for further transmission over another network such as the Internet. Thus, data is transmitted from a wireless device 102 over wireless network 101 to wireless gateway 104 and from wireless gateway 104 and cable modem 106 over wired network 107 to CMTS 108.

Figure 1B:
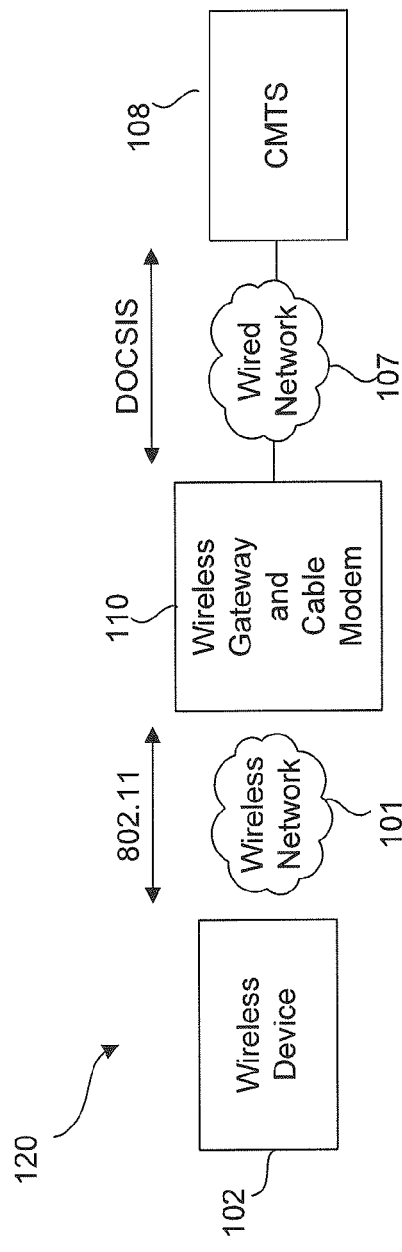
FIG. 1B illustrates an alternate communication system according to an embodiment of the invention.

FIG. 1B illustrates an alternate system 120 according to an embodiment of the invention. System 120 includes wireless device 102, wireless gateway and cable modem 110 and CMTS 108. In the embodiment in FIG. 1B, wireless gateway 104 and cable modem 106 from FIG. 1A are combined into a single physical unit which is wireless gateway and cable modem 110. In an example, wireless gateway and cable mode 110 may operate using a single processor that is configured to perform the functions of both wireless gateway 104 and cable modem 106. Alternatively, wireless gateway and cable modem 110 may be a single physical device that includes multiple processors with a first processor implementing a functionality of wireless gateway 104 and a second processor implementing functionality of cable modem 106. In the embodiment of FIG. 1B, wireless device 102 communicates with wireless gateway and cable modem 110 using 802.11 frames. Wireless gateway and cable modem 110 encapsulates data in the 802.11 frame received from wireless device 102 into DOCSIS packets that are transmitted over a DOCSIS network to cable modem termination system 108.

It is to be appreciated that wireless gateway and cable modem 110 may be used interchangeably with one or both of wireless gateway 104 and cable modem 106 because wireless gateway and cable modem 110 implements the functionality of both wireless gateway 104 and cable modem 106.

Applications running on wireless device 102 may require a certain Quality of Service (QoS) over wireless network 101 and wired network 107 for desired operation of the application. Quality-of-service (QoS) in communication protocols including but not limited to Data Over Cable Service Interface Specification (DOCSIS), PacketCable™, IEEE 802.11 etc. is the ability to guarantee a certain level of performance to a traffic flow or to provide different levels of priority to different traffic flows. For example, parameters such as a required bit rate, delay, jitter, packet loss probability and/or bit error rate may be guaranteed for different traffic flows. Quality of service guarantees are important if the network capacity is insufficient, especially for real-time streaming multimedia applications such as Voice over Internet Protocol (VoIP), online games and Internet Protocol Television (IPTV), since these often require fixed bit rate and are delay sensitive. Quality of service guarantees are also important in networks where the network capacity is a limited resource, for example in cellular data communication. QoS may be guaranteed, for example, for traffic flows generated by a particular user who subscribes to a high date rate service from his cable company. A particular QoS may also be guaranteed for traffic flows generated by certain applications. For example, traffic flows generated by streaming video and VoIP applications may be guaranteed a certain bit rate. In another example, all voice traffic flows may be allocated a certain QoS and all video traffic may be guaranteed another QoS. Users, applications and traffic flows may be used interchangeably herein.

The basic DOCSIS QoS element is a "service flow" (SF), which is a unidirectional flow of packets with guaranteed QoS parameters such as bitrate, jitter, data rate etc. For example, negotiation between cable modem 106 and CMTS 108 may be used to assign a service flow with QoS parameters guaranteed for certain traffic flows. For example, Voice Over IP (VoIP) applications may be assigned a first service flow with a first set of guaranteed QoS parameters, file transfer applications may be assigned a second service flow with a second set of guaranteed QoS parameters, and streaming multimedia may be assigned a third service flow with a third set of guaranteed QoS parameters. Examples of DOCSIS service flow parameters that indicate a QoS over wired network 107 are shown below in table 1.

TABLE 1

| DOCSIS SF Parameters |
|---|
| Traffic Priority |
| Maximum Traffic Burst |
| Minimum Reserved Traffic Rate |
| Maximum Sustained Traffic Rate |
| Tolerated Poll Jitter for Unsolicited Grant Service (UGS) |
| Nominal Grant Interval for UGS |
| Unsolicited Grant Size |

A packet from a traffic flow over wireless network 101 is assigned to a corresponding DOCSIS service flow over wired network 107 based on one or more of a Virtual Local Area Network (VLAN) Identification (ID) (referred to as "VID" herein) and header parameters associated with the packet. A cable modem 106 includes a DOCSIS classifier 210 (see FIG. 2E) that maps a packet to a service flow based on one or more of a VID associated with the packet (for example the VID in a field of the packet) and other parameters (for example parameters present in a header of the packet). The type and number of parameters used by DOCSIS classifier 210 to map a packet to a service flow may be based upon a "classifier rule" that is provisioned by a cable operator into DOCSIS classifier 210 during initialization using a configuration file or dynamically added with Dynamic Change Signaling after CM initialization. For example, in an embodiment, DOCSIS classifier 210 may utilize, in addition to VID, one or more header parameter such as Transmission Control Protocol (TCP)/User Datagram Protocol (UDP) port number, Media Access Control (MAC) address and Internet Protocol (IP) address to map a packet to a DOCSIS service flow.

In wireless networks operating under an IEEE 802.11e protocol, WiFi Access Category (AC) and Traffic Specification (Tspec) parameters may be used to determine a Quality of Service for a traffic flow. The AC parameters are broadcast by a wireless gateway 104 to all wireless devices that are associated with a particular Service Set Identifier (SSID). A particular wireless device 102 associated with a SSID can indicate to the wireless gateway 104 the Tspec parameters that correspond to its desired QoS for a traffic flow. In an example, all wireless devices 100 on wireless network 101 employ the same SSID in order to communicate with the wireless gateway 104. The SSID or "Network Name" may also be used to identify a wireless network 101. A SSID is usually determined by a network administrator setting up wireless network 101. The SSID may be broadcast from a wireless gateway 104 within wireless network 101 to enable wireless devices 100 to determine which wireless network to associate with. The wireless gateway 104 may also support multiple Service Set Identifiers (SSIDs), thus creating multiple "virtual" wireless networks. Examples of Tspec parameters that indicate QoS over wireless network 101 are shown below in table 2.

TABLE 2

TSpec Parameters

User Priority
Max Media Access Control Service Data Unit (MSDU) Size
Maximum Burst Size
Min Physical Layer (PHY) Rate
Peak Data Rate
Mean Data Rate
Delay Bound
Nominal MSDU Size
Max Service Interval For a wireless gateway 104 that supports multiple SSIDs, a given SSID may be assigned to a particular type of traffic flow that is associated with a particular QoS profile. To ensure that all the traffic generated from or destined for a given SSID has the desired QoS when being transported from the cable modem 106 to CMTS 108 over the DOCSIS network, a cable operator may statically create a DOCSIS Service Flow (SF) that has a QoS profile corresponding to the QoS profile associated with a SSID. This statically created SF can be used for the traffic associated with the corresponding SSID. A QoS profile as referred to herein is a set of QoS parameters such as TSpec parameters in table 2 or DOCSIS service flow parameters in table 1.

However, conventional cable modems 106 may map a packet received from wireless gateway 104 to a default DOCSIS service flow without considering which SSID and/or other TSpec parameters the packet is associated with. For example, a packet of a traffic flow that is associated with parameters over wireless network 101 that indicate low priority may be mapped by CM 106 to a best effort service flow and a packet of a traffic flow that is associated with TSpec parameters that indicate high priority may also be mapped to the best effort service flow. In current communication systems, there are no schemes that map a packet from a traffic flow with a first set of QoS parameters in a wireless network 101 to a corresponding service flow having a comparable second set of QoS parameters over wired network 107. For example, a VoIP call initiated by a wireless device 102 requires a guaranteed set of QoS parameters such as a certain sustained bit rate for proper operation. The Tspec parameters associated with a traffic flow assigned to packets from the VoIP call over wireless network 101 may guarantee such a sustained bit rate. However, current systems may not map the VoIP packets to DOCSIS service flows with comparable DOCSIS SF parameters that guarantee a sustained bit rate over wired network 107. If the VoIP call is not routed to a SF that has QoS parameters to support the desired QoS over wired network 107, then the VoIP application will not function properly.

The inventors have determined that the applications running on wireless devices 102 may suffer because their packets over wireless network 101 are not mapped to DOCSIS service flows that have corresponding QoS parameters over wired network 107. Accordingly, the inventors have determined methods, systems and computer program products to map the traffic flows over wireless network 101 to the DOCSIS service flows that have comparable QoS parameters over wired network 107. It is to be appreciated that although the embodiments presented herein are described with respect to the IEEE 802.11(e) protocol over wireless network 101 and the DOCSIS protocol over wired network 107, these embodiments are applicable to any type of protocol over wireless network 101 and wired network 107. For example, the mapping schemes to map QoS parameters from traffic flows in wireless network 101 to corresponding service flows with comparable QoS parameters as described herein are applicable regardless of the type of protocol implemented over wireless network 101 and wired network 107.

FIG. 2A further illustrates wireless gateway 104 according to an embodiment of the invention. Wireless gateway 104 includes a processor 202 coupled to a memory 204 and a VID mapper 200. FIG. 2B further illustrates a wireless gateway and cable modem 110 according to an embodiment of the invention. Wireless gateway and cable modem 110 also includes a processor 202 coupled to a memory 204, VID mapper 200 and DOCSIS classifier 210. Processor 202 is configured to perform the functions described herein based on instructions stored in memory 204 and/or applications 211 running on processor 202. As seen in FIGS. 2A and 2B, both wireless gateway and cable modem 110 and wireless gateway 104 include the same VID mapper 200. FIG. 2C further illustrates VID mapper 200 that maps one or more of, an SSID, an access point ID, a WiFi access category and Tspec parameter ranges to a VID that is associated with a DOCSIS SF. VID mapper 200 will be described further below.

FIG. 2D further illustrates CM 106 according to an embodiment of the invention. CM 106 includes a processor 206 coupled to a memory 208 and DOCSIS classifier 210. CM 106 classifies packets received from wireless gateway 104 into service flows using DOCSIS classifier 210. FIG. 2E further illustrates DOCSIS classifier 210 according to an embodiment of the invention. DOCSIS classifier 210, based on at least a VID field 328 (also see FIG. 3A) of a packet 250 received from wireless gateway 104, determines a corresponding DOCSIS service flow to map packet 250 to. In an example, DOCSIS classifier 210 uses provisioned or dynamic classifier rules to map packet 250 to a DOCSIS service flow based on a combination of VID 328 and other fields in a header of packet 250 as described above.

Wireless device 102 communicates with wireless gateway 104 using IEEE 802.11 frames. It is to be appreciated that the type of protocol used in wireless network 101 is a design choice and may be arbitrary. An 802.11 frame may be associated with a SSID for a particular traffic flow transmitted to wireless gateway 104. One or more of an SSID, an Access Point (AP) Identification (ID), a source MAC address, a wireless access category, and TSpec parameter ranges are associated with a QoS profile over wireless network 101. Wired network 107 has corresponding DOCSIS service flow parameters that provide a QoS profile that is similar to, comparable to, or corresponding to, a QoS profile over wireless network 102. The corresponding DOCSIS service flow between cable modem 106 and cable modem termination system 108 can be determined based on at least a VID. Thus, one or more of an SSID, an AP ID, a source MAC address, a wireless access category, and TSpec parameter ranges are used to determine a quality of service associated over wireless network 101 and a VID is used to determine the quality of service over wired network 107. According to an embodiment, wireless gateway 104 includes a VID mapper 200 that maps a packet, based on one or more of, an SSID, an AP ID, a source MAC address, a wireless access category, and TSpec parameter ranges associated with the related traffic flow to a corresponding VID that is associated with a DOCSIS service flow that has a associated QoS profile. The VID is in turn is used by DOCSIS classifier 210 in cable modem 106 or wireless gateway and cable modem 110 to classify a packet received over wireless network 101 to a DOCSIS service flow as will be described further below. The example mapping schemes that the VID mapper 200 can adopt include but are not limited to the following:

(1) In a first example, a specific SSID is mapped to a specific VID. In this case, all packets associated with the specific SSID are classified into a particular DOCSIS service flow corresponding to a specific VID that is mapped to that SSID.

(2) In a second example, a specific combination of AP ID, wireless access category and SSID are mapped to a particular VID. In this case, all packets associated with this particular combination of parameters are classified into a particular DOCSIS service flow corresponding to the mapped VID.

(3) In a third example, one or more TSpec parameter ranges are mapped to a particular VID. In this case, all packets associated with a wireless traffic flow that has TSpec parameters within specified ranges are mapped to a specific VID. The mapped VID is used by DOCSIS classifier 210 to classify the packets into a particular DOCSIS service flow corresponding to the mapped VID. For example, all packets with a peak data rate between 100 kbps and 500 kbps are mapped to a particular VID.

(4) In a fourth example, a particular source MAC address is mapped to a particular VID. In this case, all packets with the corresponding source MAC address are classified into a particular DOCSIS service flow corresponding to the mapped VID.

It is to be appreciated that other mapping schemes that use other combinations of AP ID, wireless access category, SSID, source MAC address and TSpec parameter ranges can also be used by VID mapper 200.

The mapping schemes may be configured by a cable network operator using a configuration file that is downloaded to memory 204 of wireless gateway 104 during initialization of wireless gateway 104. Alternatively, these mapping schemes may be stored in memory 204 of wireless gateway 104 or updated via Simple Network Management Protocol (SNMP) messages during runtime. To indicate the mapped VID to CM 106, wireless gateway 104 modifies an Ethernet packet transmitted to CM 108 as described below with respect to the example mapping schemes shown in FIGS. 3A-B.

FIG. 3A illustrates an example Ethernet packet 300 that may be transmitted from wireless gateway 104 to cable modem 106. Ethernet packet 300 may be based on the 802.11 frame received by wireless gateway 104 from wireless device 102. Ethernet packet 300 includes a destination media access control (MAC) address 302, a source MAC address 304, an IEEE 802.1Q tag 306, an Ether type/size field 308, a payload data field 310, and a Cyclic Redundancy Check (CRC)/Frame Check Sequence (FCS) field 312. In an example, Ethernet packet 300 received from wireless gateway 104 includes the IEEE 802.1Q tag 306. In another example, IEEE 802.1Q tag 306 is not included in the Ethernet packet 300. IEEE 802.1Q tag 306 includes a tag protocol identifier (TPID) 322, a priority code point (PCP) 324, a canonical format indicator (CFI) field 326, and virtual local area network identification (VID) 328.

In FIG. 3A, VID mapper 200, based on a mapping scheme associated with SSID 320 in VID mapper 200 determines a corresponding VID 328, which corresponds to a comparable quality of service over wired network 107. The determination of VID 328 corresponding to the SSID 320 may be made using a mapping table configured by the service operator. VID 328 is inserted into the IEEE 802.1Q tag 306 if the IEEE 802.1Q tag 306 is present in Ethernet packet 300. If the IEEE 802.1Q tag 306 is not present, then the IEEE 802.1Q tag 306 (which includes VID 328) may be inserted into packet 300. In another example, the field for VID 328 in IEEE 802.1Q tag 306 may already include a value when it is received by wireless gateway 104. If the value in VID field 328 is not equal to the one determined by VID mapper 200 then the value is replaced by the value determined by VID mapper 200. Cable modem 106 encapsulates packet 300 in a DOCSIS format and transmits the DOCSIS packet to cable modem termination system 108 over wired network 107. Cable modem 106 includes a DOCSIS classifier 210 which determines a DOCSIS service flow corresponding to VID 328.

FIG. 3B shows another embodiment according to an embodiment of the invention. In FIG. 3B, VID mapper 200 determines a VID 328 based on the combination of access point ID 319, WiFi access category 321 and SSID 320. Access point ID 319 is a unique identification associated with a wireless gateway 104. Access point ID 319 may indicate the QoS profile associated with a wireless gateway 104. WiFi access category 321 indicates the type of traffic flow originating from wireless device 102. Types of traffic flow include but are not limited to voice traffic, video traffic, best effort traffic etc. In this example, VID 328 can be used by CM 106 to identify not just the associated SSID for a traffic flow, but also the wireless gateway 104 that originated the request and the type of the traffic. In this embodiment, a table configured by a cable operator includes a mapping between SSID, access point ID, WiFi access category and a VID.

In an embodiment, the mapping schemes may be implemented by VID mapper 200 or by processor 202 based on instructions stored in memory 204. For example, processor 202 maps a SSID 320 indicative of a first set of Quality of Service parameters over wireless network 101 to a corresponding VID 328 indicative of a second set of Quality of Service parameters over wired network 107. The processor 202 receives Ethernet packet 300 packet over wireless network 101 and determines the SSID 320 associated with the packet. Processor 202 determines the VID 328 that identifies the DOCSIS SF parameters over wired network 107 using, for example, a mapping table. The determined VID 328 corresponds to the second set of Quality of Service parameters that is substantially equivalent to the first set of Quality of Service parameters over wireless network 101. Processor 202 inserts the VID 328 into packet 300 and transmits packet 300 to CM 106 that in turn classifies the packet to a service flow corresponding to the mapped VID and transmits it to CMTS 108 using that service flow. In another example, wireless gateway and cable modem 110 receives an IEEE 802.11 frame from wireless device 102, inserts VID 328, encapsulates the received IEEE 802.11 frame into a DOCSIS format, classifies the packet to the service flow corresponding to the mapped VID, and transmits the DOCSIS packet to CMTS 108 in that service flow.

FIG. 4 illustrates an example mapping of traffic flows from a wireless network 101 to service flows in wired network 107 using a VID to bridge these two types of flows. For example, for a first traffic flow, VID mapper 200 may map a combination of SSID 1, Access Point ID and WiFi Access Category to a VID 3. DOCSIS classifier 210 classifies packets with VID 3 to service flow 4 which has QoS profile 4. QoS profile 4 may include, for example, DOCSIS service flow parameters of maximum sustained traffic rate and traffic priority (see table 1). In another example, all traffic associated with SSID 6 is mapped to VID 9 which in turn is classified by DOCSIS classifier 210 to service flow 9 which has QoS profile 9. QoS profile 9 may include, for example, DOCSIS service flow parameters of unsolicited grant size and nominal grant interval for UGS (see table 1). In another example, all traffic that corresponds to a Tspec parameter range of peak data rate (see table 2) between 100 kbps and 500 kbps is mapped by VID mapper 200 to VID 8 which in turn is classified by DOCSIS classifier 210 service flow 2 which has QoS profile 2. QoS profile 2 may include, for example, DOCSIS service flow parameters of minimum reserved traffic rate, maximum sustained traffic rate and traffic priority.

In an embodiment, VID mapper 200 is software based and runs on processor 202. In another example, VID mapper 200 is based on hardwired logic gates and is based only in hardware. In another example, VID mapper 200 is a combination of hardware, software, firmware or any combination thereof. In an example, DOCSIS classifier 210 is software that runs on processor 206. In another example, DOCSIS classifier 210 is based on hardwired logic gates and is based only in hardware. In another embodiment, DOCSIS classifier 210 is a combination of hardware, software, firmware or any combination thereof.

FIG. 5 illustrates an example flow chart 500 illustrating steps performed to map a packet from a wireless network 101 to wired network 107 according to an embodiment of the invention. Flowchart 500 will be described with continued reference to the example operating environment depicted in FIGS. 1-4. However, the flowchart is not limited to these embodiments. Note that some steps shown in flowchart 500 do not necessarily have to occur in the order shown. The steps in flow chart 500 may be performed by, for example, one or more of VID mapper 200 and processor 202.

In step 502, a packet is received over wireless network 101. For example, an 802.11 frame is received by wireless gateway 104 from wireless device 102.

In step 504, a first set of QoS parameters associated with the received packet are determined. For example, the first set of QoS parameters is determined based on one or more of an SSID 320, access point ID 319, WiFi access category 321, a MAC source address, and TSpec parameter ranges.

In step 506, a second parameter over wired network 107 is determined based on the first set of QoS parameters determined in step 504. For example, based on a table that contains a static mapping scheme, a VID 328 corresponding to the first set of QoS parameters is determined. In another embodiment, the VID 328 is determined dynamically in real time by processor 202 and/or VID mapper 200.

In step 508, the second parameter is inserted into the packet. For example, the VID 328 is inserted into an 802.1Q tag of Ethernet packet 300.

In step 510, the packet is transmitted to cable modem 106. Cable modem 106 encapsulates the packet into a DOCSIS format, classifies the packet into a service flow corresponding to VID 328, and sends it to CMTS 108. In another embodiment, wireless device and cable modem 110 performs such encapsulation, classification and transmission.

Embodiments presented herein, or portions thereof, can be implemented in hardware, firmware, software, and/or combinations thereof. The embodiments presented herein apply to any communication system that utilizes packets for data transmission.

The representative packet processing functions described herein (e.g. functions performed by processor 202, VID mapper 200 or DOCSIS classifier 210 can be implemented in hardware, software, or some combination thereof. For instance, the method of flowchart 500 can be implemented using computer processors, such as processor 202, VID mapper 200, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the packet processing functions described herein could be embodied by computer program instructions that are executed by a computer processor, for example processor 202, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as instruction memory 204, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A system to map a traffic flow communicated over a wireless network to a service flow communicated over a wired network, comprising:
 a memory; and
 a processor coupled to the memory and, based on instructions stored in the memory, configured to:
  receive a packet of the traffic flow over the wireless network;
  determine a first set of parameters that identify the traffic flow, wherein the first set of parameters includes at least one of a Service Set Identification (SSID), an access point identification, a WiFi category, and a Traffic Specification (Tspec) parameter;
  determine a second parameter that identifies the service flow communicated over the wired network based on the first set of parameters that identify the traffic flow communicated over the wireless network, wherein the second parameter is a Virtual Local Area Network Identification (VID);

insert the second parameter in a field of the packet; and transmit the packet over the wired network, wherein the wired network is a Data Over Cable Service Interface Specification (DOCSIS) network.

2. The system of claim 1, wherein the wireless network is a Wireless Local Area Network (WLAN).

3. The system of claim 1, wherein the first set of parameters indicate a Quality of Service associated with the traffic flow over an Institute of Electrical and Electronics Engineers (IEEE) 802.11e Wireless Local Area Network (WLAN).

4. The system of claim 1, wherein the second parameter indicates a Quality of Service associated with the service flow over the DOCSIS network.

5. The system of claim 4, wherein the processor is further configured to, based on instructions stored in the memory, transmit the packet to a cable modem (CM).

6. The system of claim 1, wherein the Tspec parameter is an Institute of Electrical and Electronics Engineers (IEEE) 802.11e Tspec parameter and a Quality of Service of the traffic flow is indicated by the IEEE Tspec parameter.

7. The system of claim 1, wherein a Quality of Service of the service flow is indicated by one or more of DOCSIS service flow parameters.

8. The system of claim 1, wherein a format of the packet received over the wireless network is an Institute of Electrical and Electronics Engineers (IEEE) 802.11 frame format.

9. The system of claim 1, wherein a format of the packet transmitted over the wired network is a DOCSIS format.

10. The system of claim 1, wherein the processor is configured to, based on instructions stored in the memory, determine the second parameter based on a mapping table stored in the memory that maps the first set of parameters to the second parameter based on a first Quality of Service over the wireless network and a second Quality of service over the wired network.

11. The system of claim 1, wherein the processor is configured to, based on instructions stored in the memory, determine the second parameter in real time based on a first Quality of Service over the wireless network and a corresponding second Quality of Service over the wired network.

12. The system of claim 1, wherein the field is a VID field in an Institute of Electrical and Electronics Engineers (IEEE) 802.1Q tag of an Ethernet packet.

13. The system of claim 1, wherein the processor is configured to, based on instructions stored in the memory, insert a tag in the packet that includes the field that stores the second parameter.

14. The system of claim 1, wherein the processor is configured to, based on instructions stored in the memory, replace a parameter stored in the field with the second parameter if the stored parameter is not equal to the second parameter.

15. The system of claim 1, wherein the first set of parameters further includes a source Media Access Control (MAC) address.

16. The system of claim 1, wherein the system is a standalone wireless gateway.

17. The system of claim 1, wherein the system is a wireless gateway integrated with a cable modem.

18. The system of claim 1, wherein the first set of parameters includes the SSID.

19. A method to map a traffic flow communicated over a wireless network to a service flow communicated over a wired network, comprising:

receiving a packet of the traffic flow over the wireless network;

determining a first set of parameters that identify the traffic flow communicated over the wireless network, wherein the first set of parameters includes at least one of a Service Set Identification (SSID), an access point identification, a WiFi category, and a Traffic Specification (Tspec) parameter;

determining a second parameter that identifies the service flow communicated over the wired network based on the first set of parameters that identify the traffic flow communicated over the wireless network, wherein the second parameter is a Virtual Local Area Network Identification (VID);

inserting the second parameter in a field of the packet; and transmitting the packet over the wired network, wherein the wired network is a Data Over Cable Service Interface Specification (DOCSIS) network.

20. The method of claim 19, wherein the wireless network is a Wireless Local Area Network (WLAN).

21. The method of claim 19, wherein the first set of parameters indicate a Quality of Service associated with the traffic flow over an Institute of Electrical and Electronics Engineers (IEEE) 802.11e Wireless Local Area Network (WLAN).

22. The method of claim 19, wherein the second parameter indicates a Quality of Service associated with the service flow over the DOCSIS network.

23. The method of claim 22, further comprising:

transmitting the packet to a cable modem (CM).

24. The method of claim 19, wherein the first set of parameters indicate a Quality of Service for the traffic flow over the wireless network.

25. The method of claim 19, wherein the second parameter indicates a Quality of Service for the service flow over the wired network.

26. The method of claim 19, wherein a format of the packet received over the wireless network is that of an Institute of Electrical and Electronics Engineers (IEEE) 802.11 frame.

27. The method of claim 19, wherein a format of the packet transmitted over the wired network is a DOCSIS format.

28. The method of claim 19, wherein the determining the second parameter comprises: determining the second parameter based on a mapping table that maps the first set of parameters to the second parameter based on a first Quality of Service over the wireless network and a second Quality of service over the wired network.

29. The method of claim 19, wherein the determining the second parameter comprises: determining the second parameter in real time based on a first Quality of Service over the wireless network and a corresponding second Quality of Service over the wired network.

30. The method of claim 19, wherein the field is a VID field in an Institute of Electrical and Electronics Engineers (IEEE) 802.1Q tag of an Ethernet packet.

31. The method of claim 19, further comprising: inserting a tag in the packet that includes the field that stores the second parameter.

32. The method of claim 19, further comprising: replacing a parameter stored in the field with the second parameter if the stored parameter is not equal to the second parameter.

33. The method of claim 19, wherein the first set of parameters further includes a source Media Access Control (MAC) address.

34. The method of claim 19, wherein the packet is received by a standalone wireless gateway.

35. The method of claim 19, wherein the packet is received by a wireless gateway that is integrated with a cable modem.

* * * * *

UNITED STATES PATENT AND TRADEMARK OFFICE
CERTIFICATE OF CORRECTION

| | | |
|---|---|---|
| PATENT NO. | : 8,917,625 B2 | Page 1 of 1 |
| APPLICATION NO. | : 12/943209 | |
| DATED | : December 23, 2014 | |
| INVENTOR(S) | : Li et al. | |

It is certified that error appears in the above-identified patent and that said Letters Patent is hereby corrected as shown below:

In the Claims

In column 11, line 18, please replace "cable modem" with --Cable Modem--.

In column 11, line 36, please replace "service" with --Service--.

In column 12, line 27, please replace "cable modem" with --Cable Modem--.

Signed and Sealed this
Second Day of June, 2015

Michelle K. Lee
*Director of the United States Patent and Trademark Office*